United States Patent
Kleen

(10) Patent No.: US 10,013,335 B2
(45) Date of Patent: Jul. 3, 2018

(54) DATA FLOW ANALYSIS IN PROCESSOR TRACE LOGS USING COMPILER-TYPE INFORMATION METHOD AND APPARATUS

(71) Applicant: Intel Corporation, Santa Clara, CA (US)

(72) Inventor: Andreas Kleen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 49 days.

(21) Appl. No.: 14/977,071

(22) Filed: Dec. 21, 2015

(65) Prior Publication Data
US 2017/0177463 A1 Jun. 22, 2017

(51) Int. Cl.
*G06F 11/00* (2006.01)
*G06F 11/36* (2006.01)

(52) U.S. Cl.
CPC ...... *G06F 11/3644* (2013.01); *G06F 11/3624* (2013.01)

(58) Field of Classification Search
CPC ............. G06F 11/3624; G06F 11/3644; G06F 2009/45587; G06F 11/366; G06F 11/3636; G06F 11/3471; G06F 11/348
See application file for complete search history.

(56) References Cited

U.S. PATENT DOCUMENTS

| | | | | |
|---|---|---|---|---|
| 5,615,357 A * | 3/1997 | Ball | ................... | G06F 11/3428 703/21 |
| 5,848,264 A * | 12/1998 | Baird | .................. | G06F 11/3636 703/28 |
| 5,907,709 A * | 5/1999 | Cantey | .................. | G06F 11/366 714/E11.211 |
| 6,353,924 B1 * | 3/2002 | Ayers | .................. | G06F 11/3466 714/E11.2 |
| 6,543,028 B1 * | 4/2003 | Jamil | .................. | G06F 11/1032 714/52 |

(Continued)

FOREIGN PATENT DOCUMENTS

| | | |
|---|---|---|
| JP | S6292035 A | 4/1987 |
| JP | 02-235150 | 9/1990 |

(Continued)

OTHER PUBLICATIONS

IBM, "IBM OS Linkage Editor and Loader" Jan. 1972, IBM, p. 1-250.*

(Continued)

*Primary Examiner* — Bryce P Bonzo
*Assistant Examiner* — Jeison C Arcos
(74) *Attorney, Agent, or Firm* — Schwabe, Williamson & Wyatt, P.C.

(57) ABSTRACT

A program control flow trace is obtained from a processor trace module, which may be hardware based, and is used, in combination with debug information and information from dissassembly of basic blocks, to identify candidate store instruction(s) which produced a memory corruption. The candidate store instruction(s) and links to a software program may be used to further debug the memory corruption and/or to instrument the software program to identify basic block(s) which produced the memory corruption in future executions of the compiled software program and/or to track debugging of the software program.

17 Claims, 5 Drawing Sheets

(56) References Cited

U.S. PATENT DOCUMENTS

| | | | |
|---|---|---|---|
| 6,718,485 B1* | 4/2004 | Reiser | G06F 11/3466 712/227 |
| 6,769,116 B1 | 7/2004 | Sexton | |
| 7,409,602 B2* | 8/2008 | Spadari | G06F 11/261 703/28 |
| 7,739,374 B1* | 6/2010 | Frey | G06F 11/0709 709/223 |
| 8,407,798 B1* | 3/2013 | Lotem | G06F 21/55 726/18 |
| 8,762,951 B1* | 6/2014 | Kosche | G06F 11/3476 717/127 |
| 9,619,313 B2* | 4/2017 | Stark | G06F 11/0787 |
| 2003/0135789 A1* | 7/2003 | DeWitt, Jr. | G06F 11/3466 714/38.13 |
| 2004/0054989 A1* | 3/2004 | Harres | G06F 11/079 717/124 |
| 2004/0221270 A1* | 11/2004 | Witchel | G06F 8/71 717/124 |
| 2007/0006159 A1* | 1/2007 | Hecht | G06F 11/3636 717/124 |
| 2007/0006170 A1* | 1/2007 | Hasse | G06F 11/366 717/131 |
| 2008/0109796 A1* | 5/2008 | Kosche | G06F 11/3612 717/158 |
| 2008/0127149 A1* | 5/2008 | Kosche | G06F 8/443 717/158 |
| 2009/0307667 A1* | 12/2009 | Booth | G06F 11/3624 717/128 |
| 2011/0016455 A1* | 1/2011 | Perry | G06F 11/34 717/130 |
| 2011/0072418 A1 | 3/2011 | Kalamegham et al. | |
| 2012/0297370 A1* | 11/2012 | Sale | G06F 11/3636 717/128 |
| 2012/0317551 A1* | 12/2012 | Hecht | G06F 11/3636 717/128 |
| 2013/0054942 A1* | 2/2013 | Serrano | G06F 11/3612 712/234 |
| 2014/0059523 A1* | 2/2014 | Frazier | G06F 11/348 717/128 |
| 2014/0122826 A1 | 5/2014 | Jacob et al. | |
| 2014/0281424 A1* | 9/2014 | Bobba | G06F 9/3005 712/225 |
| 2015/0317338 A1 | 11/2015 | Radovic et al. | |
| 2016/0371139 A1* | 12/2016 | Stark | G06F 11/0787 |

FOREIGN PATENT DOCUMENTS

| | | |
|---|---|---|
| JP | 08-297597 | 12/1996 |
| JP | 2014182797 A | 9/2014 |
| WO | WO2007/002940 A2 | 1/2007 |

OTHER PUBLICATIONS

International Search Report and Written Opinion dated Feb. 21, 2017 for International Application No. PCT/US2016/061856, 9 pages.

Office Action dated Feb. 6, 2018 for Japanese Patent Application No. 2016-225010, 4 pages.

* cited by examiner

DATA FLOW ANALYSIS IN PROCESSOR TRACE LOGS USING COMPILER-TYPE INFORMATION METHOD AND APPARATUS

BACKGROUND

Memory corruption can occur in a computer program when the contents of a memory location are unintentionally modified due to programming errors. When the corrupted memory contents are used later in that program, it leads either to program crash or to unexpected and generally unwanted program behavior.

Memory corruption can be difficult to fix for at least two reasons: 1) The source of the memory corruption and its manifestation may be far apart, making it hard to correlate the cause and the effect. 2) Such errors may only occur under unusual conditions, making it hard to consistently reproduce the error.

When debugging memory corruptions, a common debug approach is to use data address trace to find the previous code locations that wrote to the corrupt memory location. However, data address trace is expensive in terms of performance overhead. In contrast, processor trace provides a relatively compact runtime program control flow trace for a logical CPU thread for debugging, but does not provide data address trace.

Existing hardware debug solutions to the "finding last store to corrupted location" problem need at least address trace or full data trace or even replay support in hardware. However, data address trace is expensive to implement in hardware on fast out-of-order cores; it also has high overhead due to the required bandwidth to log the trace information. Program slicing techniques can identify the corrupting store, but typically need instrumented code and access to the full program flow graph in the compiler. Memory corruption in trivial programs can be solved with program slicing, but this is not the case for more complex programs.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
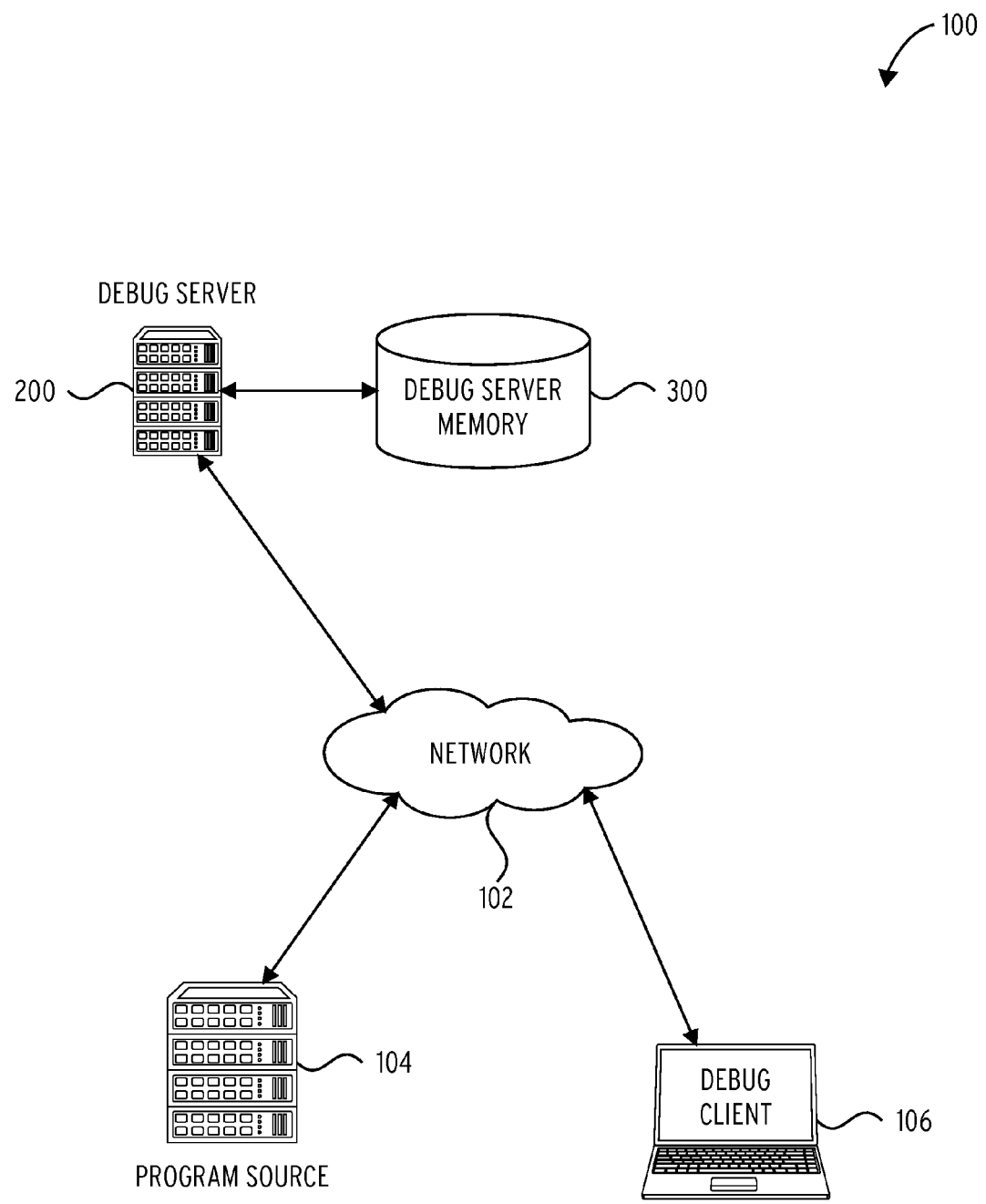
FIG. 1 illustrates a simplified system 100 in which server 200 and client device 104 are connected to network 102.

FIG. 1 illustrates a system 100 in which Debug Server 200 is used to debug memory corruption in a software program.

In overview, Debug Server 200 (illustrated and discussed further in relation to FIG. 2) comprises a Processor Trace Module 224, which Processor Trace Module 224 comprises a hardware unit which provides program control flow trace information, including runtime program control flow trace. Processor Trace Module 224 may be, for example, one or more Intel® Processor Trace units incorporated into or in communication with one or more Central Processing Unit 210 in Debug Server 200.

Processor Trace Module 224 records execution flow and allows execution flow to be reconstructed at a later time. Processor Trace Module 224 captures information about software execution on each hardware thread (assuming multiple processors cores are present in Central Processing Unit 210 or assuming a single core executing multiple threads, such as if simultaneous multithreading ("Hyper-Threading") is active) using dedicated hardware facilities so that, after execution completes, the exact program flow can be reconstructed from the captured trace data.

Processor Trace Module 224 captures control flow tracing information in data packets, including, for example, basic blocks, timing and program flow information (e.g. branch targets, branch taken/not taken indications) and program-induced mode related information (e.g., Intel TSX state transitions, CR3 changes). Basic blocks are defined herein as a software instruction which has no branch in, other than an entry into the software instruction, and no branch out, other than at the exit of the software instruction. Information from Processor Trace Module 224 may be presented as nodes representing basic blocks, branch targets, and branches taken. However, Processor Trace Module 224 does not provide address trace information listing the addresses of memory locations.

Packets from Processor Trace Module 224 may be buffered internally before being sent to and stored in a memory subsystem, such as Debug Server Memory 300. When stored, these packets are referred to collectively herein as Runtime Program Control Flow Trace 310 records. These packets are referred to as "Runtime", because they may be collected at a conventional runtime for Compiled Software Program 304 which produces a memory corruption which is to be debugged, rather than being collected at another time, such as during a special-purpose execution of Compiled Software Program 304.

As discussed above, memory corruptions are a form of programming error which may be debugged. It has been estimated that approximately 10% of application crashes in systems operating the Windows® operating system are due to heap corruption. Memory corruptions occur when a memory location is unintentionally modified due to a programming error. This may occur even in the context of programming languages and techniques which seek to minimize such errors.

A common way to debug a memory corruption is to identify the basic blocks which wrote to the corrupted memory location and to then focus debugging efforts on these components. Address trace can provide information regarding which basic blocks wrote to a memory location, but address trace is expensive to implement, particularly on fast out-of-order cores. Address trace also requires a large bandwidth overhead to log the address trace information.

Runtime Program Control Flow Trace 310 from Processor Trace Module 224 is relatively compact and requires low bandwidth overhead, but it does not provide address trace information which may be required to find which code location(s) wrote to a memory corruption.

To allow use of Runtime Program Control Flow Trace 310 in debugging memory corruptions, a software program is compiled into a compiled software program, either locally at Debug Server 200 or at a separate Program Source 104. If compiled locally at Debug Server 200, the software program may be stored in Debug Server Memory 300 as Software Program 302; the compiled software program may be stored in Debug Server Memory 300 as Compiled Software Program 304. Compilation may be performed by a compiler such as, for example, Compiler Module 214 in Debug Server 200. Compilation may be substantially in advance of execution or "just in time", as in "just-in-time" compilation of bytecode or program source code to native machine code at runtime.

When compiled or during compilation, debug information may be prepared by the compiler. Debug information may comprise, for example, a list of basic blocks in Compiled Software Program 304, data type or structure of data types of the basic blocks, and a link linking or mapping an instruction address of each basic block to one or more corresponding portion(s) of the software program. The debug information may be sent to, generated by, or otherwise present in Debug Server Memory 300, where it may be stored as Debug Information 306 record(s).

As discussed further herein, the Debug Information 306 records and the Runtime Program Control Flow Trace 310 records are connected according to (in overview) the following process: i) The memory corruption is identified; ii) A code disassembler module is used to identify the register or directly specified memory address of the instruction which produced the memory corruption (which may be a directly specified memory address, an input register or indirect input register in the case of a load, or which may be a pointer, output register, or indirect output register, in the case of a store—collectively referred to herein as a "register"); iii) the Runtime Program Control Flow Trace 310 is searched or "walked back" from the memory corruption using the code disassembler module to identify the basic block(s) which loaded the register (a "store" or "store instruction"); iv) Debug Information 306 records are used to identify the data type or structure of data types used by the memory corruption; and v) this is matched to the list of basic blocks and data type or structure of data types of the basic blocks to develop candidate store instructions in the basic blocks which could have produced the memory corruption. The candidate store instructions are returned to the user (who may perform debugging) and/or the candidate store instructions are passed to an instrumentation module, which may be used to instrument the software program so that the precise store instruction which caused the memory corruption can be identified and debugged in a future execution of a re-compiled version which has been instrumented.

Completing the description of FIG. 1, in various embodiments, network 102 may include the Internet, a local area network ("LAN"), a wide area network ("WAN"), and/or other data network. In addition to traditional data-networking protocols, in some embodiments, data may be communicated according to protocols and/or standards including near field communication ("NFC"), Bluetooth, power-line communication ("PLC"), and the like. Network 102 is not required, but may be used to communicate with other computing devices.

In various embodiments, Debug Server 200, Program Source 104, and Debug Client 106 may include desktop PCs, mobile phones, laptops, tablets, wearable computers, or other computing devices that are either stand-alone or networked computers. Program Source 104 may be a source of software program, of debug information, and/or of compiled software program. Debug Client 106 may be used by a party, such as a software programmer or debugging service provider, who provides software debugging services, for example, to Debug Server 200.

In various embodiments, additional infrastructure (e.g., short message service centers, cell sites, wife base stations, routers, gateways, firewalls, and the like), as well as additional devices may be present. Further, in some embodiments, the functions described as being provided by Debug Server 200 or other of the devices illustrated in FIG. 1 may be implemented via various combinations of physical and/or logical devices. However, it is not necessary to show such infrastructure and implementation details in FIG. 1 in order to describe an illustrative embodiment.

Figure 2:
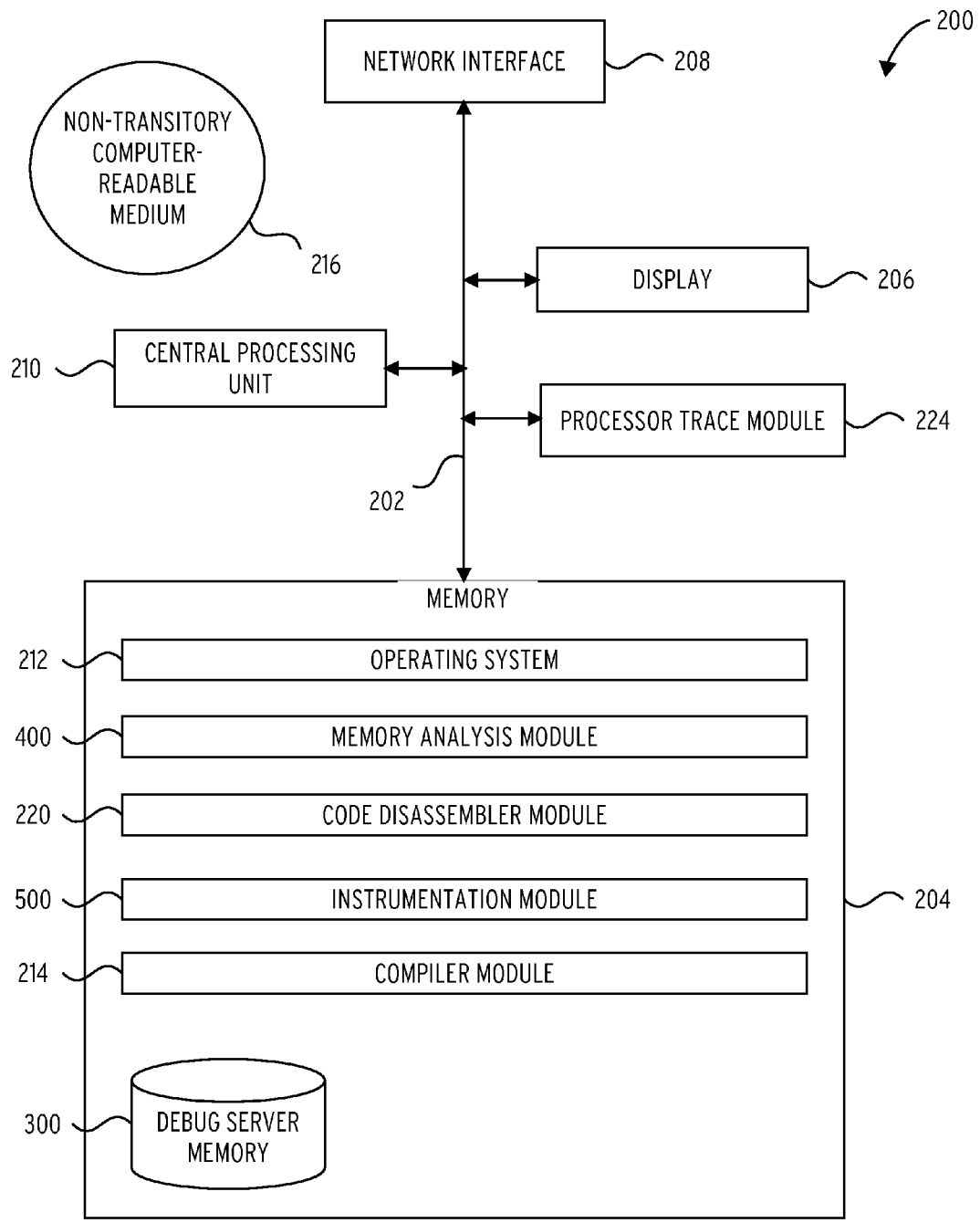
FIG. 2 illustrates a server 200 in accordance with one embodiment.

FIG. 2 illustrates several components of an exemplary Debug Server 200 in accordance with one embodiment. In various embodiments, Debug Server 200 may include a desktop PC, server, workstation, mobile phone, laptop, tablet, set-top box, appliance, or other computing device that is capable of performing operations such as those described herein. In some embodiments, Debug Server 200 may include many more components than those shown in FIG. 2. However, it is not necessary that all of these generally conventional components be shown in order to disclose an illustrative embodiment.

As discussed elsewhere, Debug Server 200 comprises Processor Trace Module 224, which may be a hardware-based unit which provides program control flow trace information, including runtime program control flow trace. Processor Trace Module 224 may be, for example, one or more Intel® Processor Trace units incorporated into or in communication with one or more Central Processing Unit 210 in Debug Server 200.

In various embodiments, Debug Server 200 may comprise one or more physical and/or logical devices that collectively provide the functionalities described herein. In some embodiments, Debug Server 200 may comprise one or more replicated and/or distributed physical or logical devices.

In some embodiments, Debug Server 200 may comprise one or more computing resources provisioned from a "cloud computing" provider, for example, Amazon Elastic Compute Cloud ("Amazon EC2"), provided by Amazon.com, Inc. of Seattle, Wash.; Oracle Cloud Compute Utility, provided by Oracle Corporation of Redwood City, Calif.; Windows Azure, provided by Microsoft Corporation of Redmond, Wash., and the like.

Debug Server 200 includes bus 202 interconnecting several components including network interface 208, display 206, Central Processing Unit 210, and memory 204.

Memory 204 generally comprises a random access memory ("RAM") and permanent non-transitory mass storage device, such as a hard disk drive or solid-state drive. Memory 204 stores an operating system 212.

These and other software components may be loaded into memory 204 of Debug Server 200 using a drive mechanism (not shown) associated with a non-transitory computer-readable medium 216, such as a floppy disc, tape, DVD/CD-ROM drive, memory card, or the like.

Memory 204 also includes Debug Server Memory 300. In some embodiments, Debug Server 200 may communicate with Debug Server Memory 300 via network interface 208, a storage area network ("SAN"), a high-speed serial bus, and/or via the other suitable communication technology.

In some embodiments, Debug Server Memory 300 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Figure 3:
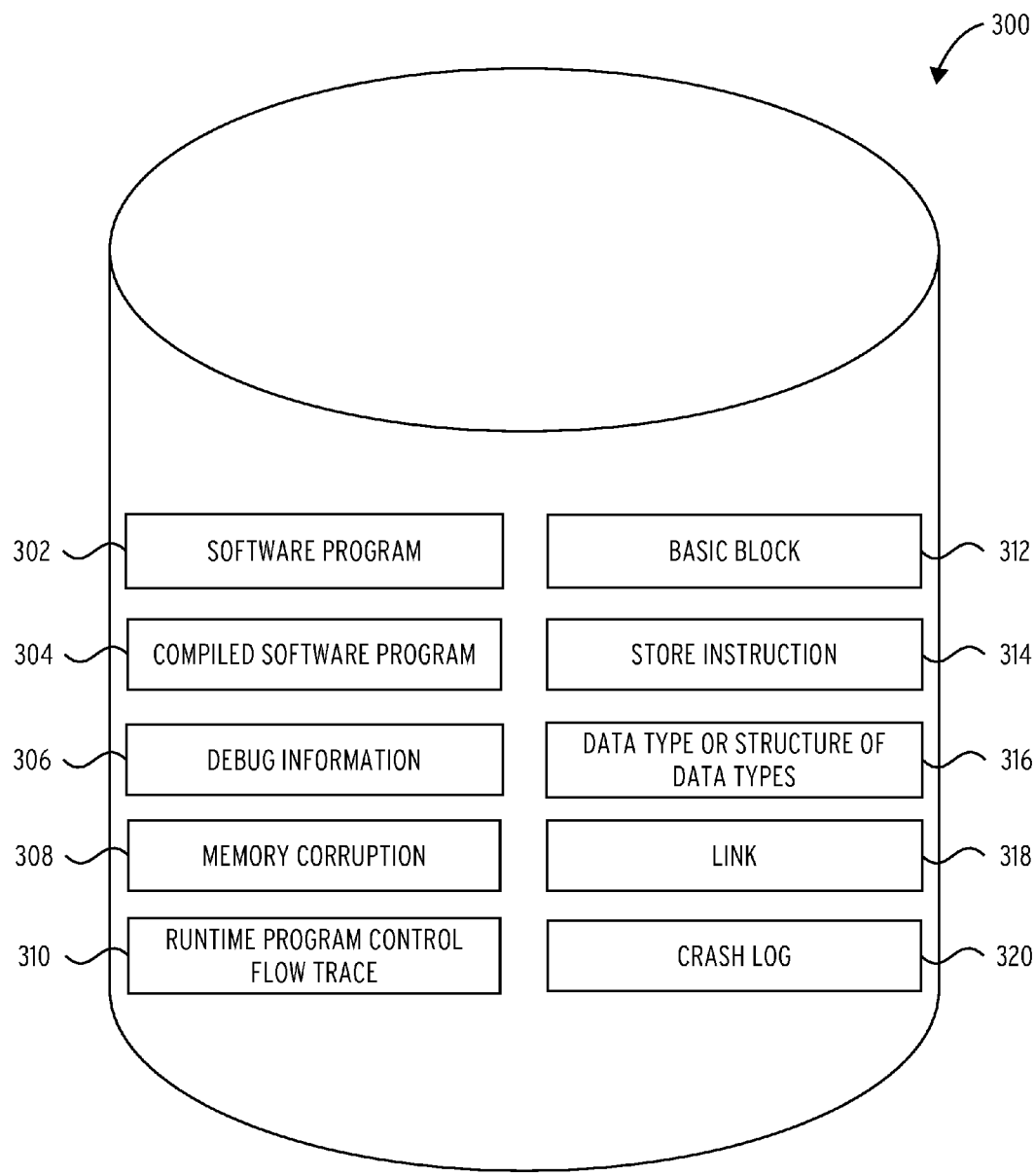
FIG. 3 is a functional block diagram of an embodiment of Debug Server Datastore.

In relation to FIG. 3, the illustrated components of Debug Server Memory 300 are data groups used by Modules or software routines and are discussed further herein in the discussion of other of the Figures.

The data groups used by routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar.

Figure 4:
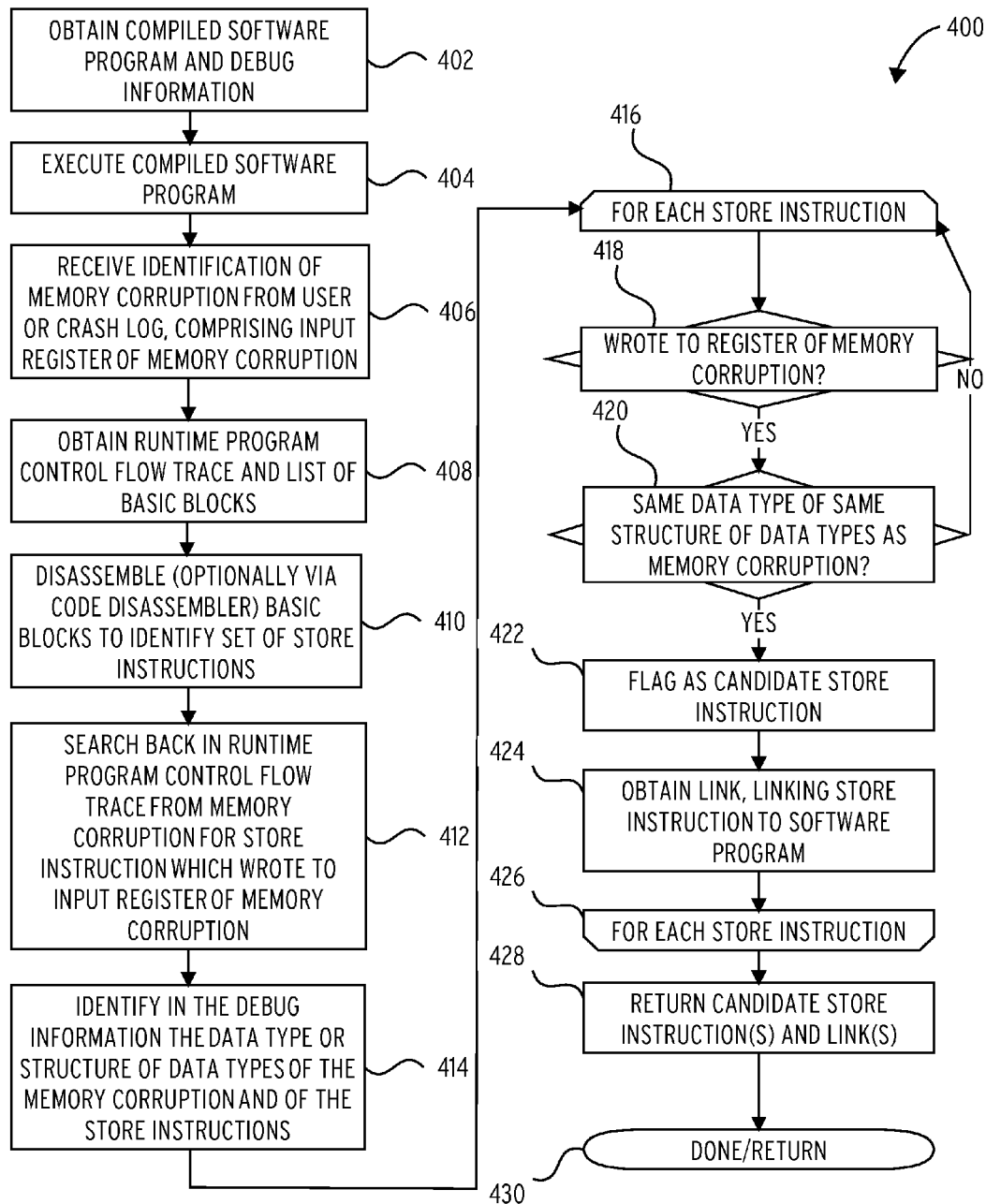
FIG. 4 is a flow chart illustrating an example embodiment of a Memory Analysis Module.

Memory Analysis Module 400, as shown in FIG. 4, may be executed by, for example, Debug Server 200.

At block 402, Memory Analysis Module 400 obtains a compiled software program and debug information. This may be obtained from a third-party source, such as Program Source 104, or it may be obtained locally, through execution of Compiler Module 214 relative to Software Program 302. When stored in Debug Server Memory 300, debug information may be stored as Debug Information 306 records and compiled software program may be stored as Compiled Software Program 304.

At block 404, Memory Analysis Module 400 may optionally execute Compiled Software Program 304. Execution of compiled software program may be remote, relative to a computer executing Memory Analysis Module 400, such as at or by Program Source 104 and/or Debug Client 106. Execution of compiled software program may produce a crash log, which crash log may be sent to, generated by, or otherwise stored in Debug Server Memory 300 as Crash Log 320 record(s).

At block 406, Memory Analysis Module 400 may receive identification of at least one memory corruption in Compiled Software Program 304. Identification may be received from a human user or programmatically from a crash log, such as Crash Log 320. Identification of memory corruption may comprise identification of a register used by and/or assigned to memory corruption. Memory corruption may be stored in Debug Server Memory 300 as Memory Corruption 308 record(s).

At block 408, Memory Analysis Module 400 obtains runtime program control flow trace from a processor trace module. As discussed elsewhere, processor trace module may be hardware based, such as Processor Trace Module 224. Rruntime program control flow trace may comprise information from execution of compiled software program across or by a plurality of central processing units. This may be obtained locally, such as from Processor Trace Module 224 during local execution of Compiled Software Program 304, or it may be obtained from a remote source, such as from Debug Client 106 or the like. In either case, it may be stored as Runtime Program Control Flow Trace 310 record(s) in Debug Server Memory 300.

At block 408, Memory Analysis Module 400 also obtains from Runtime Program Control Flow Trace 310 record(s) a list of basic blocks in Compiled Software Program 304. The list of basic blocks may be stored as Basic Block 312 records in Debug Server Memory 300.

At block 410, Memory Analysis Module 400 disassembles, such as through use of Code Disassembler Module 220, Basic Block 312 in the list of basic blocks to identify Basic Block 312 records which are or comprise store instructions, meaning they store data, such as a value, a vector, a matrix, or a variable to a memory location in the computer executing compiled software program. Store instruction(s) may be stored in Debug Server Memory 300 as Store Instruction 314 records.

At block 412, Memory Analysis Module 400 searches back, or "walks" in Runtime Program Control Flow Trace 310 from the location of Memory Corruption 308 to identify the one or more Store Instruction 314(s) which wrote to the register of Memory Corruption 308.

At block 414, Memory Analysis Module 400 identifies in Debug Information 306 the data type or structure of data types assigned to or used by Memory Corruption 308 as well as the data type or structure of data types of the Store Instruction 314(s). These may be stored in Debug Server Memory 300 as Data Type or Structure of Data Types 316 records.

Opening loop block 416 to closing loop block 426 iterate for each Store Instruction 314 record.

At decision block 418, Memory Analysis Module 400 determines whether the then-current Store Instruction 314 record wrote to the register of Memory Corruption 308, such as of block 406. If negative, Memory Analysis Module 400 may proceed to the next Store Instruction 314; if no more Store Instruction 314 records are to be processed, Memory Analysis Module 400 may proceed to block 428.

If affirmative at decision block 418, Memory Analysis Module 400 may proceed to decision block 420 to determine whether the Store Instruction 314 has the same Data Type or Structure of Data Types 316 of Memory Corruption 308. If negative at decision block 420, Memory Analysis Module 400 may proceed to the next Store Instruction 314; if no more Store Instruction 314 records are to be processed, Memory Analysis Module 400 may proceed to block 428.

At block 422, Memory Analysis Module 400 may flag those Store Instruction 314 records which were affirmative at both decision block 418 and decision block 420 as being candidate Store Instruction 314(s), meaning that such Store Instruction 314(s) wrote to the register of Memory Corruption 308 and had the same Data Type or Structure of Data Types 316 as Memory Corruption 308.

At block 424, Memory Analysis Module 400 may obtain a link, linking or mapping candidate Store Instruction 314(s) to instructions in (uncompiled) Software Program 302. This link may be obtained from, for example, Debug Information 306. Such links may be store in Debug Server Memory 300 as Link 318 records.

At closing loop block 426, Memory Analysis Module 400 may return to opening loop block 416 to iterate over the next Store Instruction 314, if any.

At block 428, Memory Analysis Module 400 may pass or return candidate Store Instruction 314(s), of block 422, and Link 318, of block 424 to another process, module, or a user.

The returned candidate Store Instruction 314(s) may be used, for example, by a user to debug Software Program 302. The candidate Store Instruction 314(s) and Link 318(s) may be used by, for example, Instrumentation Module 500 to instrument Software Program 302 to more readily identify Basic Block 312 in a future execution of re-compiled Software Program 302, including instrumentation and any bug fixes.

At done block 430, Memory Analysis Module 400 may conclude and/or return to a process which spawned it.

Figure 5:
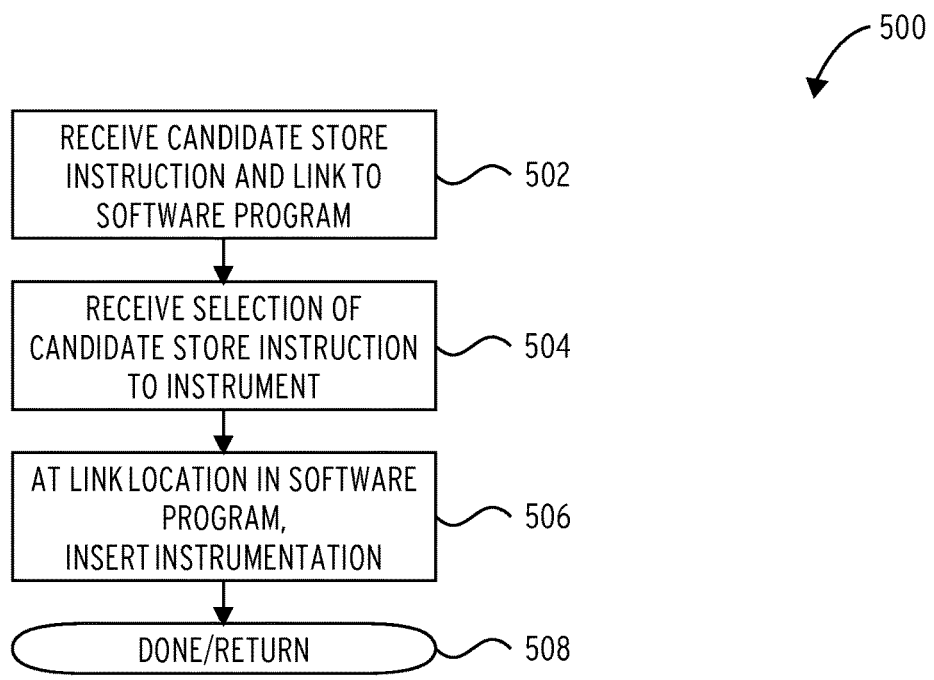
FIG. 5 is a flow chart illustrating an example embodiment of an Instrumentation Module.

Instrumentation Module 500, as shown in FIG. 5, may be executed by, for example, Debug Server 200 or another suitable computer, such as Debug Client 106 or Program Source 104.

At block 502, Instrumentation Module 500 receives candidate store instruction(s) and links linking or mapping candidate store instruction(s) to portions of software program, such as from Memory Analysis Module 400. The candidate store instruction(s) may be candidate Store Instruction 314 record(s), the software program may be Software Program 302 record(s), and the link(s) may be Link 318(s).

At block 504, Instrumentation Module 500 may receive a selection of candidate store instruction(s) to instrument. This may be provided by a user or another process. This is optional; Instrumentation Module 500 may instrument software program for all candidate store instruction(s). As used herein, "instrumentation" and "software instrumentation" refers to computer software and/or hardware which performs at least one of the following: i) monitors and/or measures performance and/or behavior of a computer software and/or hardware process, ii) diagnoses or produces information which enables diagnosing errors, and iii) writes or produces information which enables trace information; "to instrument" means to include instructions in source code and/or binary code, which code performs one of the foregoing and reports either raw data or a processed result thereof. Non-limiting examples of instrumentation comprise code tracing, debugging, performance counters, and event logs.

At block 506, Instrumentation Module 500 may insert, at the location identified by link, software instrumentation. The software instrumentation may comprise, for example, a Uniform Resource Identifier ("URI") and an instruction to request data from and/or provide data to the URI, which instruction may identify a basic block at the link location. The software instrumentation may comprise output to debug information and/or output during execution of compiled software program, which output may be used to identify a basic block at the link location, inputs to and outputs of such basic block, a data type or structure of data types of such basic block and the like.

At done block 508, Instrumentation Module 500 may conclude and/or return to a process which spawned it.

Following are examples illustrating embodiments of this disclosure:

Example 1

An apparatus for computing, including debugging of a software program, comprising: a memory analysis module to be operated by a computer processor to: obtain a compiled software program compiled from the software program and a debug information; receive identification of a memory corruption in the compiled software program; obtain a runtime program control flow trace having a list of basic blocks of the compiled software program; disassemble or cause to be disassembled the list of basic blocks to identify a set of store instructions; identify in the debug information a data type or structure of data types of the memory corruption and of a store instruction in the set of store instructions; determine a candidate store instruction which has the data type or structure of data types of the memory corruption and obtain at least one link linking the candidate store instruction to a portion of the software program; and return the candidate store instruction and the link.

Example 2

The apparatus of Example 1, wherein the debug information is prepared during compilation of the software program and wherein the debug information comprises a definition of a basic block in the list of basic blocks, the data type or structure of data types of the basic block, and a link mapping an instruction address of the basic block to the portion of the software program.

Example 3

The apparatus of Example 1, wherein disassemble or cause to be disassembled the list of basic blocks to identify the set of store instructions is with a code disassembler module and wherein the memory analysis module is further to receive a crash log comprising a register of the memory corruption and wherein the memory analysis module is further to search back or cause to be searched back with the code disassembler module in the runtime program control flow trace from the memory corruption to identify at least one store instruction in the set of store instructions which loaded the register of the memory corruption and which has the data type or structure of data types of the register, and identify the at least one store instruction as the candidate store instruction.

Example 4

The apparatus of Example 1, wherein return the candidate store instruction and the link comprises display the candidate store instruction and the link for a user.

Example 5

The apparatus of Example 1, wherein return the candidate store instruction and the link comprises passage of the candidate store instruction and the link to an instrumentation module, which instrumentation module is to instrument the software program to identify the candidate store instruction in a future debug information.

Example 6

The apparatus of Example 1, wherein the runtime program control flow trace is obtained from a processor trace module during an execution of the compiled software program, which execution produced the memory corruption.

Example 7

The apparatus of Example 6, wherein the processor trace module is hardware-based.

Example 8

The apparatus of Example 6, wherein the execution of the compiled software program was by a plurality of central processing units and the runtime program control flow trace comprises data from the plurality of central processing units.

Example 9

The apparatus of any one of Example 1 to Example 8, wherein each basic block in the list of basic blocks comprises a software instruction which has no branch in, other than an entry into the software instruction, and no branch out, other than at the exit of the software instruction, and which basic block is a node in the runtime program control flow trace.

Example 10

The apparatus of any one of Example 1 to Example 8, wherein the store instruction records a value, a vector, a matrix, or a variable to a memory location in the computer.

Example 11

A method for debugging a software program, comprising: in a computing device comprising a processor and a memory, obtaining a compiled software program compiled from the software program and a debug information; receiving identification of a memory corruption in the compiled software program; obtaining a runtime program control flow trace having a list of basic blocks of the compiled software program; disassembling or causing to be disassembled the list of basic blocks to identify a set of store instructions; identifying in the debug information a data type or structure of data types of the memory corruption and of a store instruction in the set of store instructions; determining a candidate store instruction which has the data type or structure of data types of the memory corruption and obtain at least one link linking the candidate store instruction to a portion of the software program; and returning the candidate store instruction and the link.

Example 12

The method of Example 11, wherein the debug information is prepared during compilation of the software program and wherein the debug information comprises a definition of a basic block in the list of basic blocks, the data type or structure of data types of the basic block, and a link mapping an instruction address of the basic block to the portion of the software program.

Example 13

The method of Example 11, further comprising receiving a crash log comprising an input register of the memory corruption, searching back or causing to be searched back with a code disassembler module in the runtime program control flow trace from the memory corruption to identify at least one store instruction in the set of store instructions which loaded the register of the memory corruption and which has the data type or structure of data types of the register, and identify the at least one store instruction as the candidate store instruction.

Example 14

The method of Example 11, wherein returning the candidate store instruction and the link comprises displaying the candidate store instruction and the link for a user.

Example 15

The method of Example 11, wherein returning the candidate store instruction and the link comprises instrumenting the software program to identify the candidate store instruction in a future debug information.

Example 16

The method of Example 11, further comprising obtaining the runtime program control flow trace from a processor trace module during an execution of the compiled software program, which execution produced the memory corruption.

Example 17

The method of Example 16, wherein the processor trace module is hardware-based.

Example 18

The method of Example 16, wherein the execution of the compiled software program was by a plurality of central processing units and the runtime program control flow trace comprises data from the plurality of central processing units.

Example 19

The method of any one of Example 11 to Example 18, wherein each basic block in the list of basic blocks comprises a software instruction which has no branch in, other than an entry into the software instruction, and no branch out, other than at the exit of the software instruction, and which basic block is a node in the runtime program control flow trace.

Example 20

The method of any one of Example 11 to Example 18, wherein the store instruction records a value, a vector, a matrix, or a variable to a memory location in the computer.

Example 21

An apparatus for computing, including debugging of a software program, comprising: means to obtain a compiled software program compiled from the software program and a debug information; means to receive identification of a memory corruption in the compiled software program; means to obtain a runtime program control flow trace having a list of basic blocks of the compiled software program; means to disassemble or means to cause to be disassembled the list of basic blocks to identify a set of store instructions; means to identify in the debug information a data type or structure of data types of the memory corruption and of a store instruction in the set of store instructions; means to determine a candidate store instruction which has the data type or structure of data types of the memory corruption and obtain at least one link linking the candidate store instruction to a portion of the software program; and means to return the candidate store instruction and the link.

Example 22

The apparatus of Example 21, further comprising means to obtain the debug information from a compilation of the software program and wherein the debug information comprises a definition of a basic block in the list of basic blocks, the data type or structure of data types of the basic block, and a link mapping an instruction address of the basic block to the portion of the software program.

Example 23

The apparatus of Example 21, wherein means to disassemble or means to cause to be disassembled the list of basic blocks to identify the set of store instructions comprise a code disassembler module and further comprising means to receive a crash log comprising a register of the memory corruption and further comprising means to search back or cause to be searched back with the code disassembler module in the runtime program control flow trace from the memory corruption to identify at least one store instruction in the set of store instructions which loaded the register of the memory corruption and which has the data type or structure of data types of the register, and means to identify the at least one store instruction as the candidate store instruction.

Example 24

The apparatus of Example 21, wherein means to return the candidate store instruction and the link comprises means to display the candidate store instruction and the link for a user.

Example 25

The apparatus of Example 21, wherein means to return the candidate store instruction and the link comprises means to instrument the software program to identify the candidate store instruction in a future debug information.

Example 26

The apparatus of Example 21, further comprising means for a processor trace module, which means for the processor trace module determine the runtime program control flow trace during an execution of the compiled software program, which execution produced the memory corruption.

Example 27

The apparatus of Example 26, wherein the means for the processor trace module is hardware-based.

Example 28

The apparatus of Example 26, wherein the execution of the compiled software program was by a plurality of central processing units and the runtime program control flow trace comprises data from the plurality of central processing units.

Example 29

The apparatus of any one of Example 21 to Example 28, wherein each basic block in the list of basic blocks comprises a software instruction which has no branch in, other than an entry into the software instruction, and no branch out, other than at the exit of the software instruction, and which basic block is a node in the runtime program control flow trace.

Example 30

The apparatus of any one of Example 21 to Example 28, wherein the store instruction records a value, a vector, a matrix, or a variable to a memory location in the computer.

Example 31

One or more computer-readable media comprising instructions that cause a computing device to debug a software program in response to execution of the instructions by one or more processors of the computing device, wherein debug the software program includes to: obtain a compiled software program compiled from the software program and a debug information; receive identification of a memory corruption in the compiled software program; obtain a runtime program control flow trace having a list of basic blocks of the compiled software program; disassemble or cause to be disassembled the list of basic blocks to identify a set of store instructions; identify in the debug information a data type or structure of data types of the memory corruption and of a store instruction in the set of store instructions; determine a candidate store instruction which has the data type or structure of data types of the memory corruption and obtain at least one link linking the candidate store instruction to a portion of the software program; and return the candidate store instruction and the link.

Example 32

The computer-readable media of Example 31, wherein the debug information is prepared during compilation of the software program and wherein the debug information comprises a definition of a basic block in the list of basic blocks, the data type or structure of data types of the basic block, and a link mapping an instruction address of the basic block to the portion of the software program.

Example 33

The computer-readable media of Example 31, wherein debug the software program includes to disassemble or cause to be disassembled with a code disassembler module the list of basic blocks to identify the set of store instructions, to receive a crash log comprising a register of the memory corruption, to search back or cause to be searched back with the code disassembler module in the runtime program control flow trace from the memory corruption to identify at least one store instruction in the set of store instructions which loaded the register of the memory corruption and which has the data type or structure of data types of the register, and to identify the at least one store instruction as the candidate store instruction.

Example 34

The computer-readable media of Example 31, wherein return the candidate store instruction and the link comprises display the candidate store instruction and the link for a user.

Example 35

The computer-readable media of Example 31, wherein return the candidate store instruction and the link comprises instrument or causing to be instrumented by an instrumentation module the software program to identify the candidate store instruction in a future debug information.

Example 36

The computer-readable media of Example 31, wherein to debug the software program is further to obtain the runtime program control flow trace from a processor trace module during an execution of the compiled software program, which execution produced the memory corruption.

Example 37

The computer-readable media of Example 36, wherein the processor trace module is hardware-based.

Example 38

The computer-readable media of Example 36, wherein the execution of the compiled software program was by a plurality of central processing units and the runtime program control flow trace comprises data from the plurality of central processing units.

Example 39

The computer-readable media of any one of Example 31 to Example 38, wherein each basic block in the list of basic blocks comprises a software instruction which has no branch in, other than an entry into the software instruction, and no branch out, other than at the exit of the software instruction, and which basic block is a node in the runtime program control flow trace.

Example 40

The computer-readable media of any one of Example 31 to Example 38, wherein the store instruction records a value, a vector, a matrix, or a variable to a memory location in the computer.

What is claimed is:

1. An apparatus for computing, including debugging of a software program, comprising:
 a memory analysis module to be operated by a computer processor to:
 obtain a debug information for a compiled software program compiled from a source code or bytecode for the software program;
 receive identification of a memory corruption in the compiled software program;
 obtain a runtime program control flow trace having a list of basic blocks of the compiled software program;
 disassemble or cause to be disassembled the list of basic blocks to identify a set of store instructions;
 identify in the debug information a data type or structure of data types of the memory corruption and of a store instruction in the set of store instructions;
 determine whether each store instruction in the set of store instructions is a candidate store instruction based on whether each store instruction has the data type or structure of data types of the memory corruption and has written to a memory location associated with the memory corruption; and
 obtain and output at least one link mapping each candidate store instruction to a portion of the source code or bytecode of the software program,
 wherein each basic block in the list of basic blocks comprises a software instruction which has no branch in, other than an entry into the software instruction, and no branch out, other than at an exit of the software instruction, and each basic block is a node in the runtime program control flow trace.

2. The apparatus of claim 1, wherein the debug information is prepared during compilation of the source code or bytecode and wherein the debug information comprises a definition of a basic block in the list of basic blocks, the data type or structure of data types of the basic block, and a link mapping an instruction address of the basic block to the portion of the software program.

3. The apparatus of claim 1, wherein to disassemble or cause to be disassembled the list of basic blocks to identify the set of store instructions is with a code disassembler module and wherein the memory analysis module is further to receive a crash log comprising a register of the memory corruption and wherein the memory analysis module is further to search back or cause to be searched back with the code disassembler module in the runtime program control flow trace from the memory corruption to identify at least one store instruction in the set of store instructions which loaded the register of the memory corruption and which has the data type or structure of data types of the register, and identify the at least one store instruction as the candidate store instruction.

4. The apparatus of claim 1, wherein the memory analysis module is further to display the candidate store instruction and the link for a user.

5. The apparatus of claim 1, wherein the memory analysis module is further to pass the candidate store instruction and the link to an instrumentation module, which instrumentation module is to instrument the software program to identify the candidate store instruction in a future debug information.

6. The apparatus of claim 1, wherein the runtime program control flow trace is obtained from a processor trace module during an execution of the compiled software program, which execution produced the memory corruption.

7. The apparatus of claim 6, wherein the processor trace module is hardware-based.

8. The apparatus of claim 6, wherein the execution of the compiled software program was by a plurality of central processing units and the runtime program control flow trace comprises data from the plurality of central processing units.

9. The apparatus of claim 1, wherein the store instruction records a value, a vector, a matrix, or a variable to a memory location in the computer.

10. A method for debugging a software program, comprising:
 in a computing device comprising a processor and a memory,
 obtaining a debug information for a compiled software program compiled from a source code or bytecode for the software program;
 receiving identification of a memory corruption in the compiled software program;
 obtaining a runtime program control flow trace having a list of basic blocks of the compiled software program;
 disassembling or causing to be disassembled the list of basic blocks to identify a set of store instructions;
 identifying in the debug information a data type or structure of data types of the memory corruption and of a store instruction in the set of store instructions;
 determining whether each store instruction in the set of store instructions is a candidate store instruction based on whether each store instruction has the data type or structure of data types of the memory corruption and has written to a memory location associated with the memory corruption; and
 obtaining and outputting at least one link mapping each candidate store instruction to a portion of the source code or bytecode of the software program,
 wherein each basic block in the list of basic blocks comprises a software instruction which has no branch in, other than an entry into the software instruction, and no branch out, other than at an exit of the software instruction, and each basic block is a node in the runtime program control flow trace.

11. The method of claim 10, wherein the debug information is prepared during compilation of the software program and wherein the debug information comprises a definition of a basic block in the list of basic blocks, the data type or structure of data types of the basic block, and a link mapping an instruction address of the basic block to the portion of the software program.

12. The method of claim 10, further comprising receiving a crash log comprising a register of the memory corruption, searching back or causing to be searched back with a code disassembler module in the runtime program control flow trace from the memory corruption to identify at least one store instruction in the set of store instructions which loaded the register of the memory corruption and which has the data type or structure of data types of the register, and identify the at least one store instruction as the candidate store instruction.

13. The method of claim 10, further comprising displaying the candidate store instruction and the link for a user.

14. The method of claim 10, further comprising instrumenting the software program to identify the candidate store instruction in a future debug information.

15. The method of claim 10, further comprising obtaining the runtime program control flow trace from a processor trace module during an execution of the compiled software program, which execution produced the memory corruption.

16. The method of claim 15, wherein the processor trace module is hardware-based; wherein the execution of the compiled software program was by a plurality of central processing units and the runtime program control flow trace comprises data from the plurality of central processing units.

17. One or more non-transitory computer-readable media comprising instructions that cause a computing device to debug a software program in response to execution of the instructions by one or more processors of the computing device, wherein debug the software program includes to:

obtain a debug information for a compiled software program compiled from a source code or bytecode for the software program;

receive identification of a memory corruption in the compiled software program;

obtain a runtime program control flow trace having a list of basic blocks of the compiled software program;

disassemble or cause to be disassembled the list of basic blocks to identify a set of store instructions;

identify in the debug information a data type or structure of data types of the memory corruption and of a store instruction in the set of store instructions;

determine whether each store instruction in the set of store instructions is a candidate store instruction based on whether each store instruction has the data type or structure of data types of the memory corruption and has written to a memory location associated with the memory corruption; and obtain and output at least one link mapping each candidate store instruction to a portion of the source code or bytecode of the software program, wherein each basic block in the list of basic blocks comprises a software instruction which has no branch in, other than an entry into the software instruction, and no branch out, other than at an exit of the software instruction, and each basic block is a node in the runtime program control flow trace.

* * * * *